No. 621,080. Patented Mar. 14, 1899.
N. HENQUIN.
UNDERGROUND ELECTRIC RAILWAY SYSTEM AND TRAVELING COLLECTOR THEREFOR.
(Application filed Mar. 8, 1898.)
(No Model.) 2 Sheets—Sheet 1.
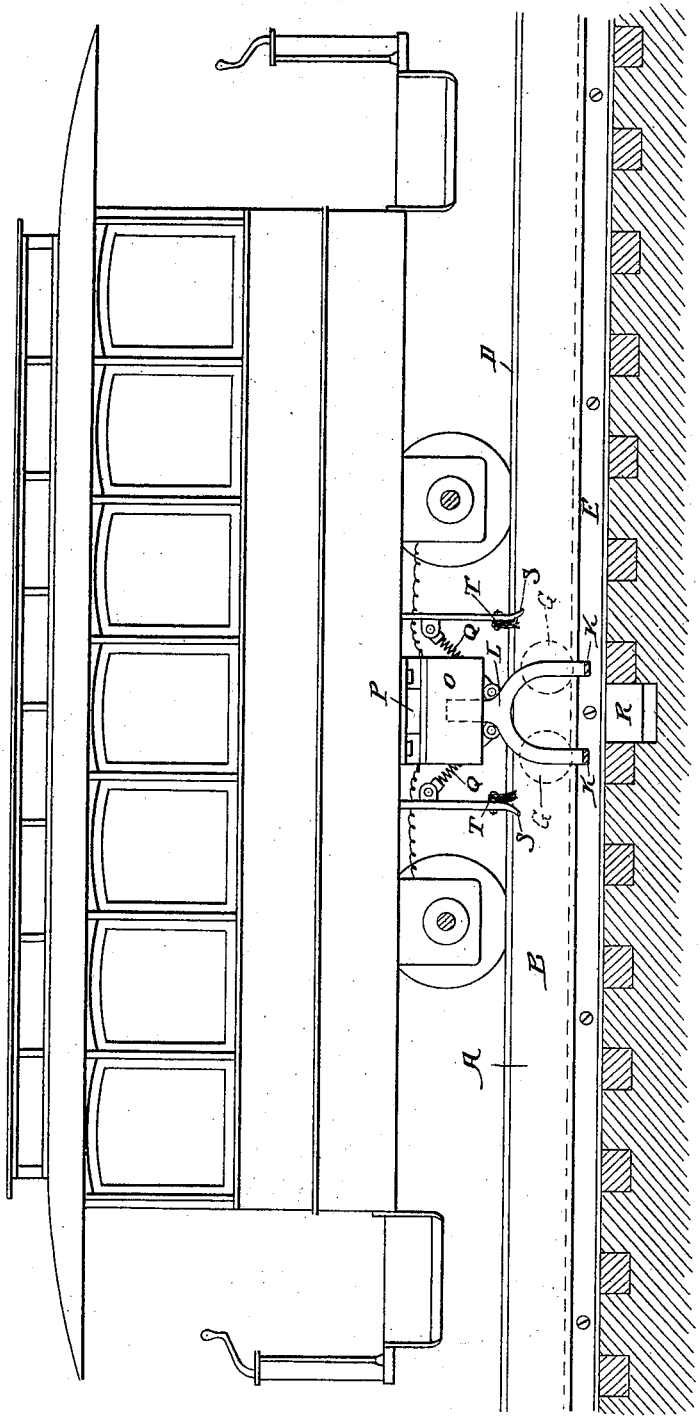

No. 621,080. Patented Mar. 14, 1899.
N. HENQUIN.
UNDERGROUND ELECTRIC RAILWAY SYSTEM AND TRAVELING COLLECTOR THEREFOR.
(Application filed Mar. 8, 1898.)
(No Model.) 2 Sheets—Sheet 2.
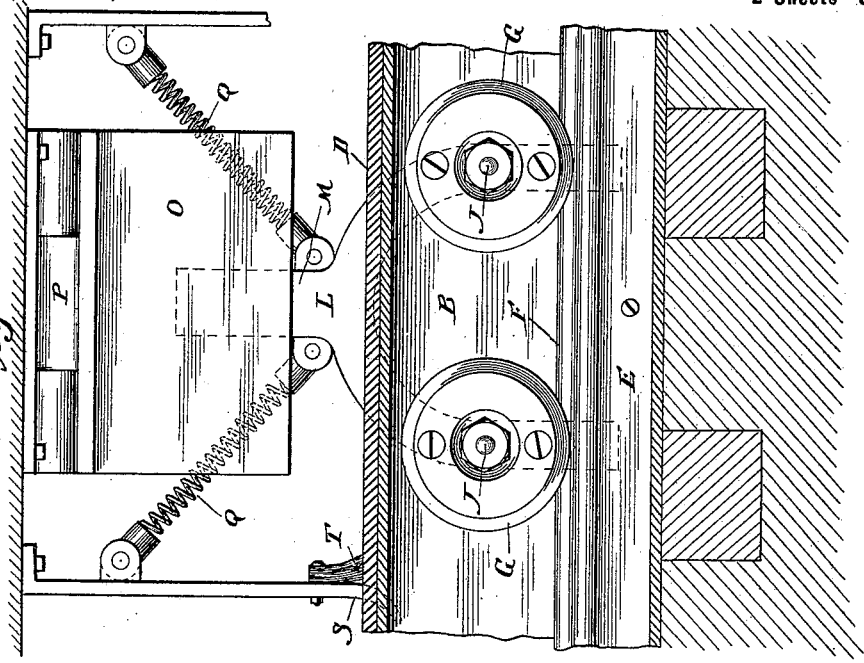
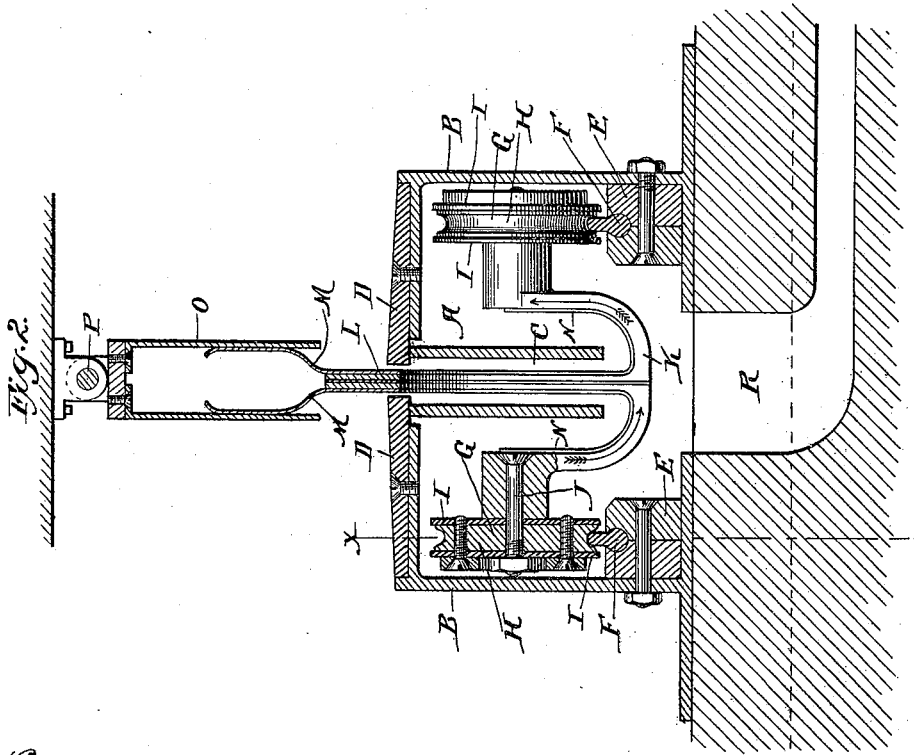
Witnesses
E. C. Wurdeman
J. Williamson
Inventor
Nestor Henquin
by Geo. L. Hazelton, Jr.
Attorney

UNITED STATES PATENT OFFICE.

NESTOR HENQUIN, OF SCHENECTADY, NEW YORK.

UNDERGROUND ELECTRIC-RAILWAY SYSTEM AND TRAVELING COLLECTOR THEREFOR.

SPECIFICATION forming part of Letters Patent No. 621,080, dated March 14, 1899.

Application filed March 8, 1898. Serial No. 673,115. (No model.)

*To all whom it may concern:*

Be it known that I, NESTOR HENQUIN, a citizen of the United States, residing at Schenectady, in the county of Schenectady and State of New York, have invented a certain new and useful Improvement in Underground Electric-Railway Systems and Traveling Collectors Therefor, of which the following is a specification.

My invention relates to a new and useful improvement in underground electric-railway systems and traveling collectors therefor, and has for its object to so construct devices of this description as to provide for the transmission of an electric current to and from a motor mounted upon a traveling car, said current to be conveyed upon conductors arranged within a conduit below the surface of the road, and these conductors are protected from contact with electrical conducting objects, thereby avoiding the loss of current; and a further object of my invention is to so inclose the conduit as to eliminate the element of danger which has heretofore existed in exposed conductors.

A still further object of my invention is to provide for the automatic detachment of the traveling collector from the car should the car be displaced from the rails by accident or otherwise; and a still further object of my invention is to so construct a conduit as to provide for the carrying off of water or other foreign substances which may tend to accumulate therein.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a side elevation of a car having my improvements fitted thereto; Fig. 2, a cross-section of the conduit and connection between the car and traveling collector, illustrating the arrangement of the collecting-truck within the conduit; and Fig. 3, a section at the line $xx$ of Fig. 2 of a portion of the conduit, showing the collector in elevation.

In carrying out my invention as here embodied I form a conduit A by the use of the irons B, which are secured to the cross-ties of the road-bed in the usual manner, so arranged relative to each other as to form the slot C between the depending flanges thereof, as clearly shown in Fig. 2. The upper surface of this conduit is protected by a suitable insulating material D, which is secured thereto by bolts or otherwise and acts as a protector against the wearing away of the conduit-irons as well as to prevent the escape of any electricity which may gather therein.

To each of the side walls of the conduit is secured the wooden stringers E, which are preferably made in two pieces and secured together by the same bolts which secure them to the side walls of the conduit, thus facilitating the placing and securement of the conductor-rails F. These rails are of the shape shown in Fig. 2, the enlargement thereof being circular in cross-section, so as to be readily retained in the semicircular grooves formed in the sections of the stringers, while the flanged or reduced portion thereof projects above said stringers and serves as a rail for the purpose hereinafter set forth.

G represents the collector-wheels, each of which is composed of a copper center H, which is faced by insulating-plates I, secured thereto in any suitable manner, and the copper centers of these wheels are of less diameter than the insulating-plates in order that said centers may be protected from contact with any portion of the conduit or obstructions which may be therein. These wheels are journaled upon the axles or studs J, which are carried by the yoke K, said wheels and yoke forming a four-wheeled truck adapted to run upon the conductor-rails F, as will be readily understood.

The yoke K is provided with a shank L, which passes upward through the slot C and has secured therebetween, but insulated therefrom, the copper plates M, said plates being connected by the wires N to the studs J, thereby being put in direct electrical communication with the collector-wheel, so that the current from the conductors passing to said wheels will be transmitted upward to the motor, as will be hereinafter set forth.

The upper portions of the copper plates M are so bent as to snugly fit within the housing O and bear against the inner walls thereof in such manner that said housing may rise and fall without affecting the position of the plates or traveling collector, thus accommodating the movements of the car in its travel, while at the same time maintaining a positive electrical connection between the collector and the motor. The housing O is also hinged at P to the under side of the car in order that it may have a limited swinging movement, thus further accommodating the crosswise oscillation of the car occasioned by the unevennesses in the track or road-bed or due to the jump occasioned by the speed thereof.

The position of the upper ends of the copper plates within the housing is maintained by the springs Q being attached at one end to the yoke-shank L and at the other end to some portion of the car and drawing in opposite directions with sufficient force to maintain the traveling collector in its proper relative position to the car, and this arrangement has the great advantage of avoiding the breakage of any portion of the collector or the injuring of the car should from any cause whatever the car become displaced, since during such process the springs would give sufficiently to permit the copper plates to leave the housing, thus in no wise injuring the apparatus.

The housing is composed of two separate plates separated or insulated from each other, one serving as a positive conductor and the other as a negative in the transmission of the current from the conductor and to and from the motor, as is well understood.

At suitable intervals drainways R lead from the bottom of the conduit to the sewerage system, thereby avoiding the accumulation of water within the conduit.

In crowded streets there is a tendency to the choking of the slot from the accumulation of dirt and stone thereon, and this would interfere with the free passage of the yoke-shank, to avoid which I provide the scrapers S, which extend downward from the car and are adapted to travel within the upper portion of the slot, thus disintegrating or removing any obstruction which may have become lodged therein, and I also provide a brush T, which is attached to the rear of this scraper and serves to sweep the upper surface of the slot, so as to insure the removal of all obstructions which might otherwise interfere with the operation of the apparatus, it being noted that there are two of such scrapers, one pointed in each direction, so as to protect the yoke-shank when the car is moving in either direction.

Of course I do not wish to be limited to the exact details of construction here shown, since these may be varied to a certain extent without departing from the spirit of my invention.

Having thus fully described my invention, what I claim as new and useful is—

1. In combination with a conduit of the character described, a collector consisting of a yoke, wheels journaled upon said yoke, said wheels having a conducting-center and insulated sides, conductors leading from the axles of the wheels, a housing secured to the under side of the car, copper plates fitted within said housing, and means for maintaining the collector in its proper relation to the housing, as specified.

2. In combination, a truck, four wheels journaled thereon, each of said wheels being composed of a conducting-center and insulated sides, a wire leading from each of the axles of the wheels, a yoke extension passing upward through the slot of the conduit, copper plates connected with the conducting-wires, said plates extending upward and being curved outward, a housing in which the curved ends of the copper plates are fitted, said housing being hinged to the under side of the car, and springs so arranged as to prevent the displacement of the collector relative to the car, substantially as shown and described.

3. In combination with a collector of the character described, conducting-plates leading therefrom and bent outward, a housing in which said plates are fitted, means for hinging said housing to the under side of the car, and means for maintaining the conducting-plates in proper relation to the housing, substantially as and for the purpose set forth.

In witness whereof I have hereunto affixed my signature in the presence of two subscribing witnesses.

NESTOR HENQUIN.

Witnesses:
JULES F. LORIN,
KILGOUR CHRISTIE.